Jan. 31, 1961 E. A. STALKER 2,969,952
ROTARY FLUID MACHINES WITH DAMPED BLADES
Filed Oct. 5, 1956 3 Sheets-Sheet 1

INVENTOR.
Edward A. Stalker

Jan. 31, 1961 E. A. STALKER 2,969,952
ROTARY FLUID MACHINES WITH DAMPED BLADES
Filed Oct. 5, 1956 3 Sheets-Sheet 2

INVENTOR.
Edward A. Stalker

INVENTOR.
Edward A. Stalker

United States Patent Office 2,969,952
Patented Jan. 31, 1961

2,969,952
ROTARY FLUID MACHINES WITH DAMPED BLADES

Edward A. Stalker, 406 N. Farragut St., Bay City, Mich.

Filed Oct. 5, 1956, Ser. No. 614,189

7 Claims. (Cl. 253—39)

My invention relates to rotary fluid machines incorporating blades, such as compressors, turbines and the like.

An object of the invention is to provide a damping means for the blades of rotary fluid machines.

Another object is to provide a blade damping means particularly adapted to fabricated rotor hubs.

Still another object is to provide a light weight rotor with disengageable blades.

Other objects will appear from the description, appended claims, and accompanying drawings.

The above objects are accomplished by the means illustrated in the accompanying drawings.

The blades of rotary compressors, turbines, rotary bladed pumps and the like vibrate during operation and tend to fail from fatigue induced by the vibration. Such failures cause a great amount of damage possibly completely ruining the compressor. It is therefore very important to preclude such failures. This invention discloses means to reduce the stresses in the blades and means to damp their vibrations so that destructive amplitudes do not occur.

By way of example only, the invention is described with respect to compressor blades and rotors.

The invention consists in part of a novel means of hinging blades to a rotor hub and of damping oscillations or vibrations of the blades. The blades are mounted to oscillate about a hinge line.

Figure 1:
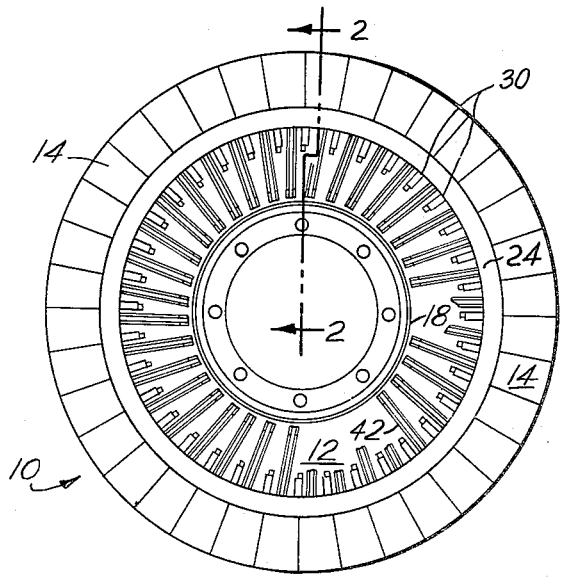
Fig. 1 is a front axial view of a rotor according to this invention.
Figure 2:
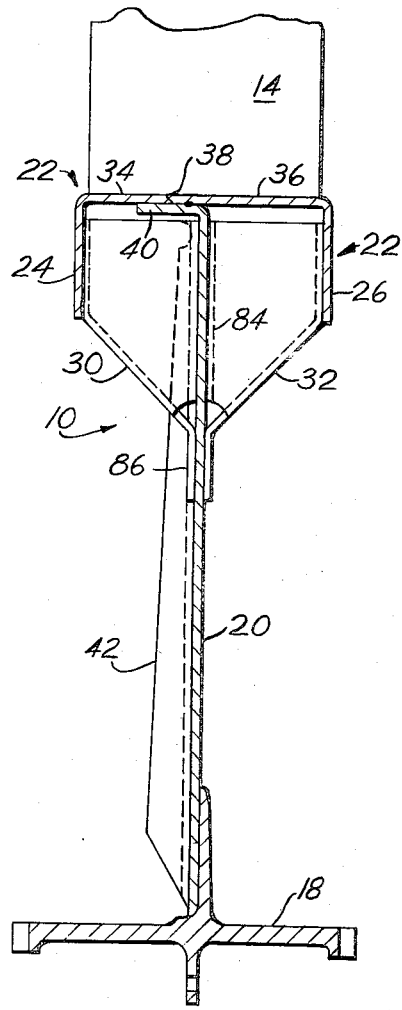
Fig. 2 is a fragmentary section on line 2—2 in Fig. 1.
Figures 3, 3A:
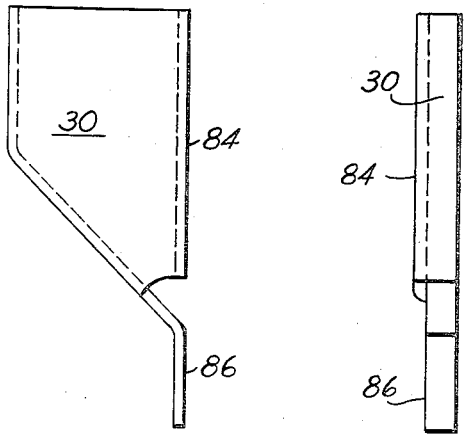
Fig. 3 is a side elevation of a bracket for securing the rim rings to the rotor or hub disk.
Fig. 3a is an axial view of the bracket of Fig. 3.

Referring now to the drawings Fig. 1 shows an axial front view of a compressor rotor 10 comprising the hub means 12 and the blades 14. The hub means comprises the clutch element 18, the disk 20 and the rim means 22 which bounds the hub means and is bathed by the flow of fluid axially thereacross between the blades. The rim means comprises the rim rings 24 and 26 and the brackets 30 and 32 positioned between the blades in peripherally spaced relation. See Figs. 2–6. These brackets support the rim rings on the disk.

The rims 34 and 36 of the rim means abut at 38 over the flange pieces 40 of the disk and are preferably spot-welded and brazed thereto. These parts 34 and 36 form the rim of the hub means. See Figs. 2 and 6 particularly.

The hub disk is preferably spot-welded and brazed to the clutch element and is stiffened by a plurality of radial channels 42. See particularly Figs. 1–5.

Figure 5:
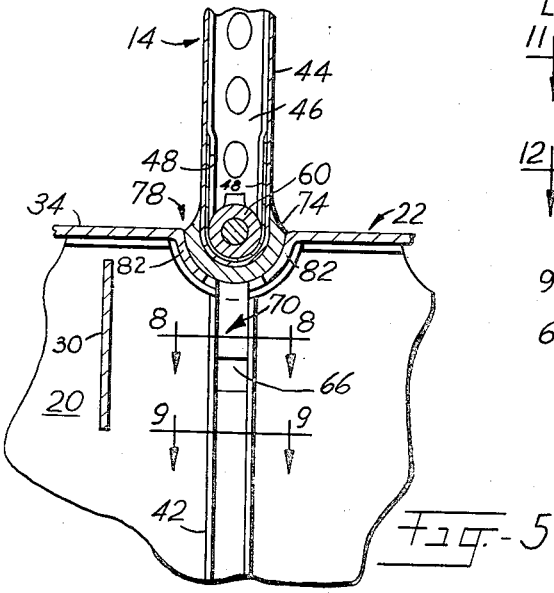
Fig. 5 is a view of the fragment of Fig. 4 on line 5—5 in Fig. 6.
Figure 4:
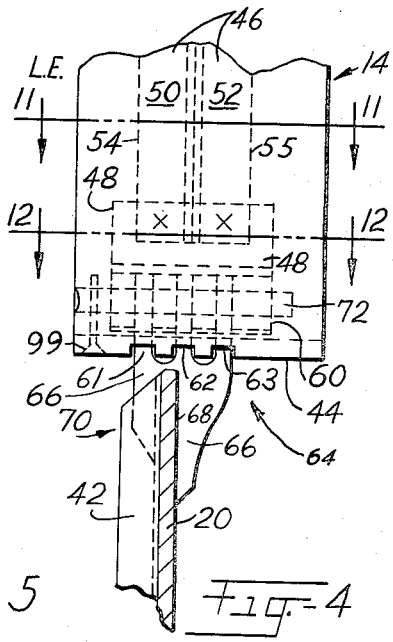
Fig. 4 is an enlarged fragment of the inner end of a blade and the associated adjacent part of the rotor hub means.
Figure 6:
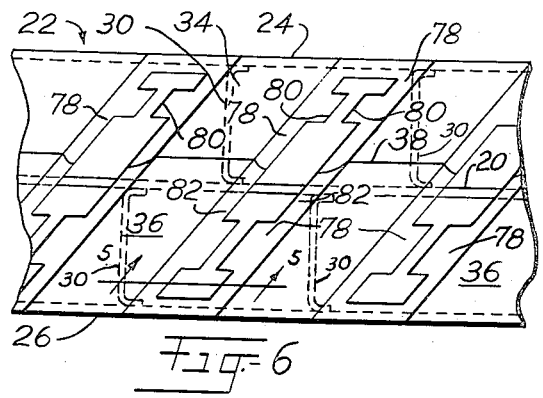
Fig. 6 is a fragmentary radial inward view of the rim of the hub means shown in developed form.
Figure 7:
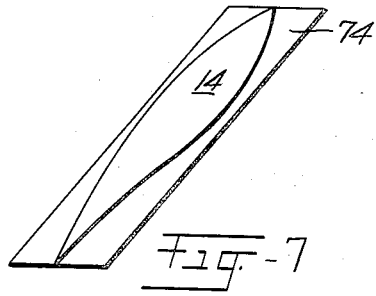
Fig. 7 is a tip end view of a blade of the rotor of Fig. 1.
Figure 8:
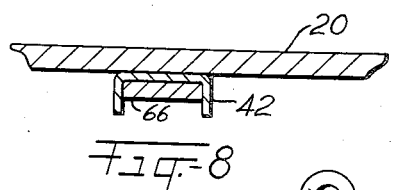
Fig. 8 is a fragmentary section on line 8—8 in Fig. 5.
Figure 9:
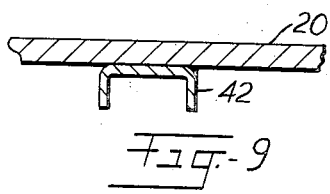
Fig. 9 is a fragmentary section on line 9—9 in Fig. 5.
Figure 10:
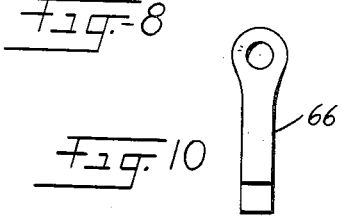
Fig. 10 is an end elevation of the connector means for articulation of each blade to the hub means.
Figure 11:
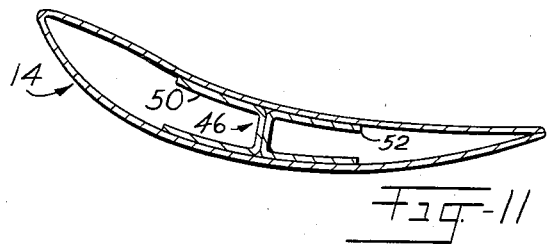
Fig. 11 is a section on line 11—11 in Fig. 4.
Figure 12:
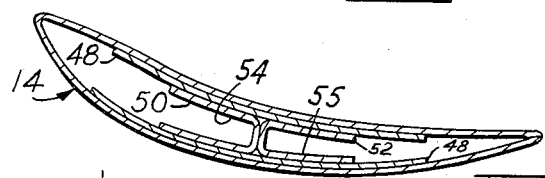
Fig. 12 is a section on line 12—12 in Fig. 4.

Each blade, Figs. 4 and 5, comprises an envelope 44, beam means 46 and strap 48. The beam means preferably comprises two channels 50 and 52 placed back to back with the flanges 54 and 56 extending chordwise. See also Figs. 11 and 12. A bearing means 60 is fixed in each blade by the strap 48 and the lower end of the envelope preferably by braze material. Each bearing means and the radially inner end of each blade is slotted to receive the ears 61—63 of the connector means 64 comprising a hinge element 66 which straddles the disks 20 at peripherally spaced locations about the disk and a hinge pin 72. Each hinge element is brazed to the disk at 68 and fixed in the recess of the rib 42 at 70 by fused metal.

Each blade is retained on its hinge element by the hinge pin passing through the bearing means and the ears 61—63. Thus each blade is articulated to the hub means.

Each blade has an arcuate friction shoe 74 fixed to its inner end and seating in an external recess 78 in the rim of rim means 22. Preferably this shoe is of dissimilar material to the blade walls and has sufficient porosity to retain or be coated by a lubricant such as oil or grease to preclude fretting of the shoe and the rims. The portions of the rim under the friction shoe are cut-away to provide the fingers (or damper elements) 80 and 82. Each recess has its length positioned at an angle to the rotor axis and has preferably arcuate contours transversely of said length with their center of arc at the center line of said pin.

Each blade is able to oscillate about the center line of the hinge pin under the action of fluid and centrifugal loads on the blades. Centrifugal force causes the fingers 80 and 82 to press against the shoe and offer damping resistance to the oscillations of the blades.

Each blade has an amplitude of oscillation limited by the side walls of the inner end of the blade which are opposite the portions of the ears 61—63 inside the blade, since the slots 61', 62', 63' admitting the ears into the bearing means 60 are of limited radial extent.

The brackets 30 and 32 are positioned between blades and serve primarily to support the rim rings 24 and 26. They are preferably fixed by fused metal at their flanges 84 and 86 to the disk 20. See Figs. 2 and 3 and 3a.

The connector means 64 limit the weight of the rotor since each said means extends peripherally for only a short distance. This provides a very light rotor with a hollow rim means 22 whose hollow interior is bounded by the rings 24 and 26. The latter have radially directed walls or legs extending inward from the rim at the root ends of the blades. The radial position of the blade ends and pins at the rotor rim facilitates inspection and removal of blades.

Figure 13:
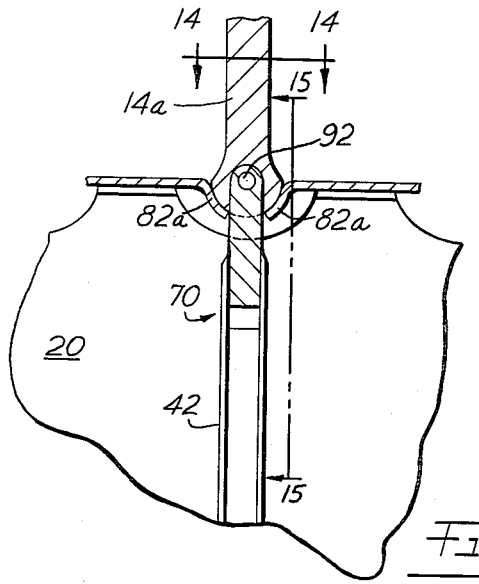
Fig. 13 is a fragmentary axial view of a blade inner end and associated portion of a hub means of another form of the invention.
Figure 15:
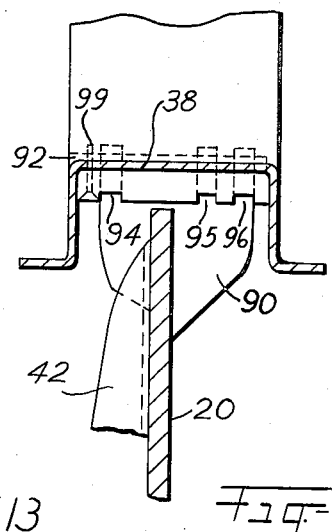
Fig. 15 is a side elevation of the fragment of Fig. 13.
Figure 14:
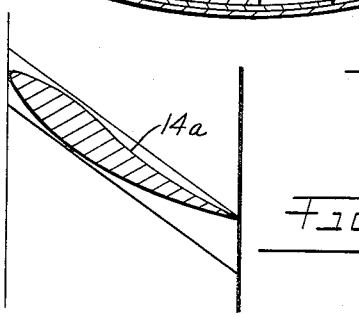
Fig. 14 is a section on line 14—14 in Fig. 13.

In another form of the invention the blades are solid as shown in Figs. 13–15. They are hinged to the hinge element 90 by pin 92 passing through the ears 94—96. The blade 14a is enlarged at its inner end to provide the cylindrical surface for rubbing on the elements 82a for damping effect.

The hinge pins are retained by the locking pin 99.

Figure 16:
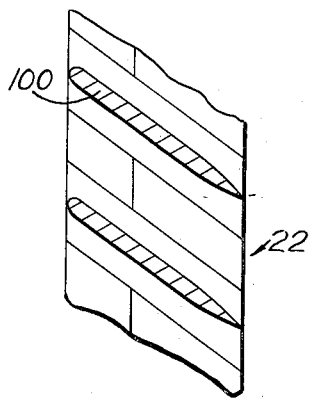
Fig. 16 shows an alternate form of blade section.

The blades may have airfoil sections such as shown by blades 100 in Fig. 16. In the latter they may be readily formed from sheet stock.

It will now be clear that I have provided a novel means of supporting blades for the damping thereof. It eliminates the principal bending at the roots of the blades and reduces their amplitude of vibration. The means of mounting the blades with damping is particularly adapted to sheet metal construction or pressed parts. By sheet metal construction is meant a structure of parts which are made either by cutting out from sheet stock about the perimeter of the part or by pressing a part cut from sheet in dies to confer on it a selected form.

While I have illustrated specific forms of the invention, it is to be understood that variations may be made therein and that I intend to claim my invention broadly as indicated by the appended claims.

I claim:

1. In combination in an axial flow compressor rotor for compressing a fluid, hub means, a sheet metal rim peripherally bounding said hub means and bathed by the flow of said fluid axially thereacross, the peripheral surface of said rim having a plurality of peripherally spaced external arcuate recesses therein, a plurality of axial flow blades peripherally spaced about said rim, each said blade having an arcuate end received in a said recess and extending radially outwardly therefrom, each said blade end conforming in contour to the walls of the respective recess and fitting closely to said wall and oscillatable relative thereto, said rim between adjacent said blades being closed to an axial flow of said fluid therethrough to sustain variations in pressure of said fluid axially along said rim between said blades, and means for oscillatably mounting each of said blades on said hub means about axes located substantially at the peripheral surface of said rim means to provide for oscillation thereof while maintaining the rim surface between blades substantially closed.

2. In combination in an axial flow compressor rotor for compressing a fluid, hub means, a sheet metal rim peripherally bounding said hub means and bathed by the flow of said fluid axially thereacross, the peripheral surface of said rim having a plurality of peripherally spaced external arcuate recesses therein, a plurality of axial flow blades peripherally spaced about said rim, each said blade having an arcuate end received in a said recess and extending radially outwardly therefrom, each said blade end conforming in contour to the walls of the respective recess and fitting closely to said wall and oscillatable relative thereto, said rim between adjacent said blades being closed to an axial flow of said fluid therethrough to sustain variations in pressure of said fluid axially along said rim between said blades, and connector means secured in said hub means and extending radially outward into each said blade including hinge pins located substantially at the peripheral surface of said rim to secure each said blade to said hub means for oscillation in said recess while maintaining the rim surface between blades substantially closed.

3. In combination in an axial flow compressor rotor for compressing a fluid, hub means, a sheet metal rim peripherally bounding said hub means and bathed by the flow of said fluid axially thereacross, the peripheral surface of said rim having a plurality of peripherally spaced external arcuate recesses therein, a plurality of axial flow blades peripherally spaced about said rim, each said blade having an arcuate end received in a said recess and extending radially outwardly therefrom, each said blade end conforming in contour to the walls of the respective recess and fitting closely to said wall and oscillatable relative thereto, said rim between adjacent said blades being closed to an axial flow of said fluid therethrough to sustain variations in pressure of said fluid axially along said rim between said blades, means for oscillatably mounting each of said blades on said hub means about axes located substantially at the peripheral surface of said rim means to provide for oscillation thereof while maintaining the rim surface between blades substantially closed, and means in said hub cooperating with a movable part of said blades for damping the oscillations thereof.

4. In combination in an axial flow compressor rotor for compressing a fluid, hub means, a sheet metal rim peripherally bounding said hub means and bathed by the flow of said fluid axially thereacross, the peripheral surface of said rim having a plurality of peripherally spaced external arcuate recesses therein, a plurality of axial flow blades peripherally spaced about said rim, each said blade having an arcuate end received in a said recess and extending radially outwardly therefrom, each said blade end conforming in contour to the walls of the respective recess and fitting closely to said wall and oscillatable relative thereto, said rim between adjacent said blades being closed to an axial flow of said fluid therethrough to sustain variations in pressure of said fluid axially along said rim between said blades, means for oscillatably mounting each of said blades on said hub means about axes located substantially at the peripheral surface of said rim means to provide for oscillation thereof while maintaining the rim surface between blades substantially closed, and means in said recesses cooperating with said arcuate ends of said blades for damping the oscillations thereof.

5. In combination in an axial flow compressor rotor for compressing a fluid, hub means, a sheet metal rim peripherally bounding said hub means and bathed by the flow of said fluid axially thereacross, the peripheral surface of said rim having a plurality of peripherally spaced external arcuate recesses therein, a plurality of axial flow blades peripherally spaced about said rim, each said blade having an arcuate end received in a said recess and extending radially outwardly therefrom, each said blade end confroming in contour to the walls of the respective recess and fitting closely to said wall and oscillatable relative thereto, said rim between adjacent said blades being closed to an axial flow of said fluid therethrough to sustain variations in pressure of said fluid axially along said rim between said blades, means for oscillatatly mounting each of said blades on said hub means about axes located substantially at the peripheral surface of said rim means to provide for oscillation thereof while maintaining the rim surface between blades substantially closed, damper elements in said recesses curved about said axes, and damper shoes carried on said blade ends curved about the same axes and in frictional engagement with said elements for damping the oscillations of said blades.

6. The combination of claim 5 in which said damper elements are mounted for movement under the action of centrifugal force into frictional damping engagement with said shoes.

7. In combination in an axial flow compressor rotor for compressing a fluid, hub means, a sheet metal rim peripherally bounding said hub means and bathed by the flow of said fluid axially thereacross, the peripheral surface of said rim having a plurality of peripherally spaced external arcuate recesses therein, a plurality of axial flow blades peripherally spaced about said rim, each said blade having an arcuate end received in a said recess and extending radially outwardly therefrom, each said blade end conforming in contour to the walls of the respective recess and fitting closely to said wall and oscillatable relative thereto, said rim between adjacent said blades being closed to an axial flow of said fluid therethrough to sustain variations in pressure of said fluid axially along said rim between said blades, means for oscillatably mounting each of said blades on said hub means about axes located substantially at the peripheral surface of said rim means to provide for oscillation thereof while maintaining the rim surface between blades substantially closed, and means for limiting the maximum extent of said oscillations.

References Cited in the file of this patent

FOREIGN PATENTS 667,979   Great Britain _____ Mar. 12, 1952